United States Patent [19]
Hasbun et al.

[11] Patent Number: 5,553,261
[45] Date of Patent: Sep. 3, 1996

[54] METHOD OF PERFORMING CLEAN-UP OF A SOLID STATE DISK WHILE EXECUTING A READ COMMAND

[75] Inventors: Robert N. Hasbun, Shingle Springs; Richard P. Garner, Cameron Park, both of Calif.

[73] Assignee: Intel Corporation, Santa Clara, Calif.

[21] Appl. No.: 221,802

[22] Filed: Apr. 1, 1994

[51] Int. Cl.[6] ........................................... G06F 12/00
[52] U.S. Cl. ..................... 395/430; 364/281.1; 364/260; 364/246.3; 364/DIG. 1
[58] Field of Search ................................. 395/425, 800, 395/430; 365/218

[56] References Cited

U.S. PATENT DOCUMENTS

| | | | |
|---|---|---|---|
| 5,313,626 | 5/1994 | Jones | 395/575 |
| 5,337,275 | 8/1994 | Garner | 365/189.01 |
| 5,341,330 | 8/1994 | Wells | 365/185 |
| 5,418,767 | 5/1995 | Gaudet | 369/58 |

OTHER PUBLICATIONS

Robinson, Kurt "Trends in Flash Memory System Design", *Wescon Conference Record*, Nov. 1990, pp. 468–472.

Primary Examiner—Eric Coleman
Attorney, Agent, or Firm—Blakely, Sokoloff, Taylor & Zafman

[57] ABSTRACT

A method of executing states of a clean-up state machine while executing a command from a host CPU to read a sector of data stored within a memory array. First, a number of sectors of data are copied from the memory array into a sector buffer. Then, while the host CPU is reading sectors from the sector buffer, a number of states of a clean-up state machine are executed to aid in the conversion of invalid user data into free memory. Also described is a solid state memory disk that converts invalid sectors of data to free memory while executing a read command from a host CPU.

18 Claims, 5 Drawing Sheets

METHOD OF PERFORMING CLEAN-UP OF A SOLID STATE DISK WHILE EXECUTING A READ COMMAND

FIELD OF THE INVENTION

The present invention pertains to the field of computer storage systems. More particularly, the present invention pertains to a method of converting invalid user memory within a solid state memory array into free memory while executing a command from a host CPU to read data stored within the solid state memory array.

BACKGROUND OF THE INVENTION

Most prior personal computers include many types of memory storage devices. Hard magnetic disk drives are used typically for mass storage, while different types of semiconductor memories are used for other purposes.

The non-volatility of hard magnetic disk drives is one of the chief reasons for their use. They may be turned on and off without loss of data. Hard drives store data on concentric tracks. Each track includes several sectors, each of which is typically 512 bytes in length.

Hard drives suffer from a number of disadvantages. Their size, their height in particular, often makes them unattractive for use in portable and lap top computers. The height of a hard disk drive has often been a limiting factor in attempts to reduce computer size to make computers more portable. Hard drives also consume relatively large amounts of power, which makes them even less attractive for computers that are battery powered.

Hard drives are less than ideal for use in computers that will used out-of-doors. Magnetic disk drives are extremely sensitive to vibration and shock. Additionally, magnetic drives do not tolerate well the dust and humidity associated with much of the great outdoors.

Semiconductor memories, also referred to as solid state memories, do not suffer from many of the disadvantages of magnetic disk drives. They are small and rugged and consume significantly less power than magnetic drives.

One type of non-volatile semiconductor memory is the FLASH electrically erasable programmable read only memory (FLASH memory). FLASH memories can be programmed by the user and once programmed retain their data until erased. FLASH memories are erased by erasing a block of memory at a time. A block is a relatively large amount of data, 64 Kbytes or 65,536 bytes.

A FLASH memory cell is erased when the net charge on the floating gate is neutral. An erased FLASH bit is referred to as a "1." Conversely, a FLASH memory cell is programmed when the net charge on the floating gate is negative. A programmed FLASH bit is referred to as a "0." A FLASH memory cell cannot be reprogrammed without a prior erasure with one exception. Any FLASH bit can be programmed to a 0 at any time.

In some prior FLASH memories the programming and erasure is controlled internally by a write state machine or a command register. Internal control of programming and erasure lessens the knowledge and time required to program and erase the FLASH memories. However, FLASH erase time times remain relatively slow despite internal control. Erase cycle time is on the order one to two seconds. If an erase must occur before every write or re-write of a sector of data it is not possible to approach magnetic disk drive write times using FLASH memory.

SUMMARY OF THE INVENTION

An object of the present invention is to provide sufficient free memory in a solid state disk for writes by a host CPU without any impact on the perceived performance of the solid state disk.

Another object of the present invention is to prevent the conversion of invalid user data to free memory within a solid state disk from being overrun during prolonged user writes to the solid state disk.

These and other objects are accomplished by the method of the present invention for executing states of a clean-up state machine while executing a command from a host CPU to read a number of sectors of data stored within a solid state disk. First, in response to the read command sectors of data are copied from a memory array of the solid state disk into a sector buffer. Then, while the host CPU is reading sectors of data from the sector buffer, a controller enables execution of a state of the clean-up state machine, which contributes to the conversion of invalid user data within the memory array to free memory.

Also to be described is a solid state memory disk that converts invalid user data stored within a memory array into free memory while executing a command from a host CPU to read sector data from the memory array. A read controller copies sectors of data into a buffer in response to the read command, and then, while the host CPU is reading sectors from the buffer, enables execution of a state of a clean-up state machine to further conversion of invalid user data into free memory.

Other objects, features, and advantages of the present invention will be apparent from the accompanying drawings and the detailed description that follows.

BRIEF DESCRIPTION OF THE FIGURES

The present invention is illustrated by way of example and not by way of limitation in the figures of the accompanying drawings in which references indicate similar elements and in which.

DETAILED DESCRIPTION

I. Overview of Solid State Disk

Figure 1:
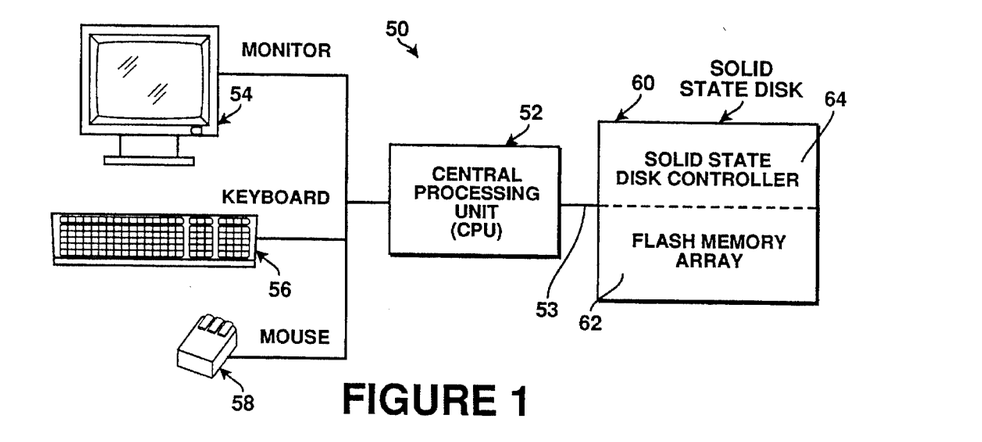
FIG. 1 is a block diagram of a personal computer including a solid state memory disk.

FIG. 1 illustrates in block diagram form personal computer 50. Personal computer 50 includes host central processing unit (CPU) 52 and monitor 54 for visually displaying information to a computer user. Keyboard 56 allows the computer user to input data to CPU 52. By moving mouse 58 the computer user moves a pointer displayed on monitor 54. Personal computer 50 uses solid state memory disk 60 for mass memory storage, rather than a hard magnetic disk. Solid state disk 60 includes solid state disk controller 64, which controls nonvolatile semiconductor memory array 62. Nonvolatile semiconductor memory array 62 is also referred to as FLASH array 62.

Solid state disk drive 60 achieves write speeds close to conventional magnetic disk drives by writing a sector of data to a new location each time the sector of data is revised, rather than erasing the previous physical location and writing the revised sector of data to that same physical location. As a result of this practice, solid state disk 60 stores both valid and invalid sectors of data. Recovering the memory space occupied by invalid sectors of data, which is also called dirty memory, mandates clean-up. Stated slightly differently, the write practices of solid state disk controller 64 require that invalid sector data be converted into free memory.

Clean-up is managed by a finite state machine, called a clean-up state machine. The clean-up state machine generally runs during periods of time when host CPU 52 is not issuing read/write commands. In accordance with present invention, the clean-up state machine also runs while read commands from host CPU 52 are being executed. This enhances clean-up performance without impacting the computer user.

A. FLASH Array and Block File Structure

Understanding of the present method of performing clean-up is aided by an understanding of the program and erase characteristics of FLASH array 62 because these strongly influence clean-up. The FLASH devices within FLASH array 62 must be erased a block at a time, but can be programmed a byte at a time. Once programmed to a 0, a bit of FLASH memory cannot be programmed to a 1 without first erasing an entire block. Erased bytes of memory are referred to as "free" because they are ready to be written.

Erasure of FLASH memory is a slow process. Performing an erase each time a sector of data is written is impractical. Writes would be slow because an entire block pair, 128 Kbytes, would have to be erased just to write one sector, 512 bytes. To allow rapid sector writes, solid state disk controller 64 writes each sector of data to a new, free location each time a sector of data is written. As a result of this write practice there may be several versions of the sector data associated with a single sector number. The most recent version of the sector data is referred to as a "valid sector" or a "user sector." The earlier version of the sector is invalid and is marked as "dirty" as part of the write.

Figure 2:
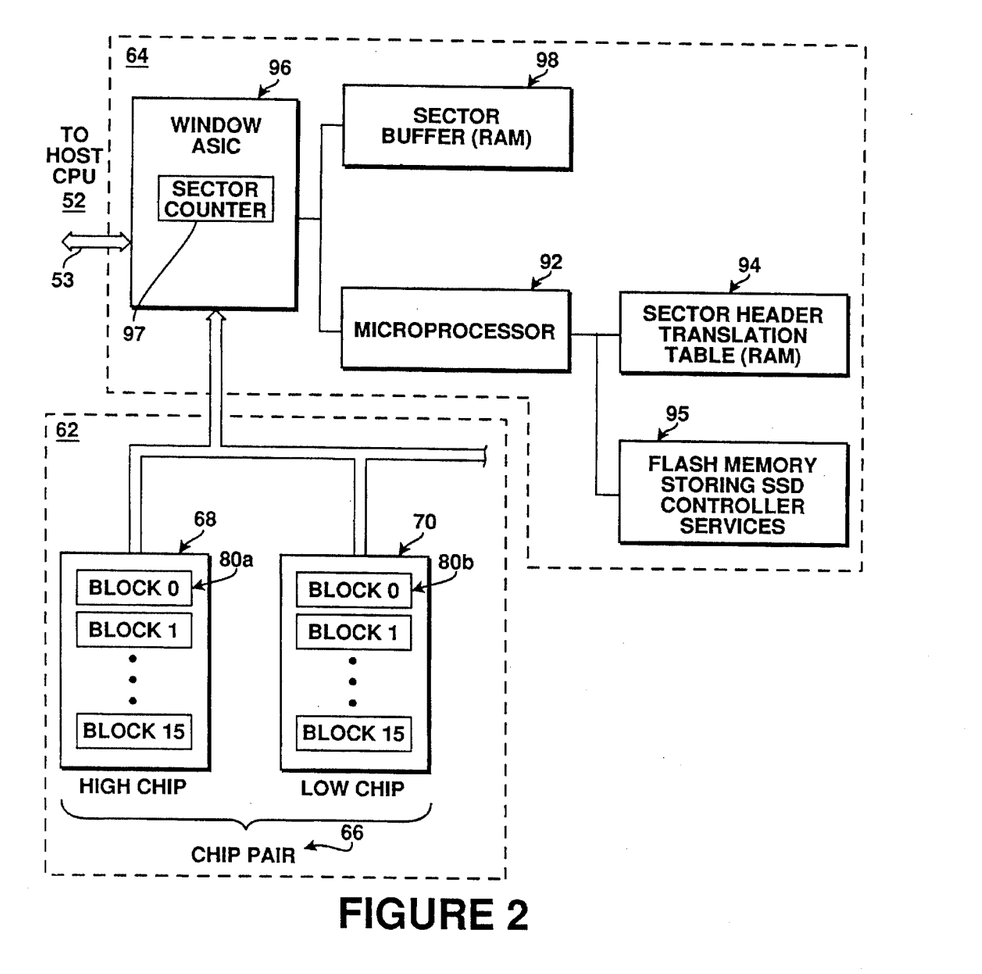
FIG. 2 a block diagram of a solid state memory disk.

FIG. 2 illustrates in block diagram form FLASH array 62 and solid state disk controller 64. In one embodiment, FLASH array 62 uses several 1 megabyte by 8 FLASH memory chips. Each FLASH chip inputs and outputs data 8 bits at a time. To permit word-wide input and output, FLASH array 62 is organized as pairs of FLASH devices, only one chip pair 66 of which is shown. High chip 68 of chip pair 66 stores the high byte of a word, while low chip 70 stores the lower byte of a word.

Each chip pair is organized as 16 blocks, each including 128 Kbytes of memory. Because each block of memory can store many sectors of data, each block includes a block sector translation table (BSTT) 84 to identify and locate each sector of data.

Figure 3:
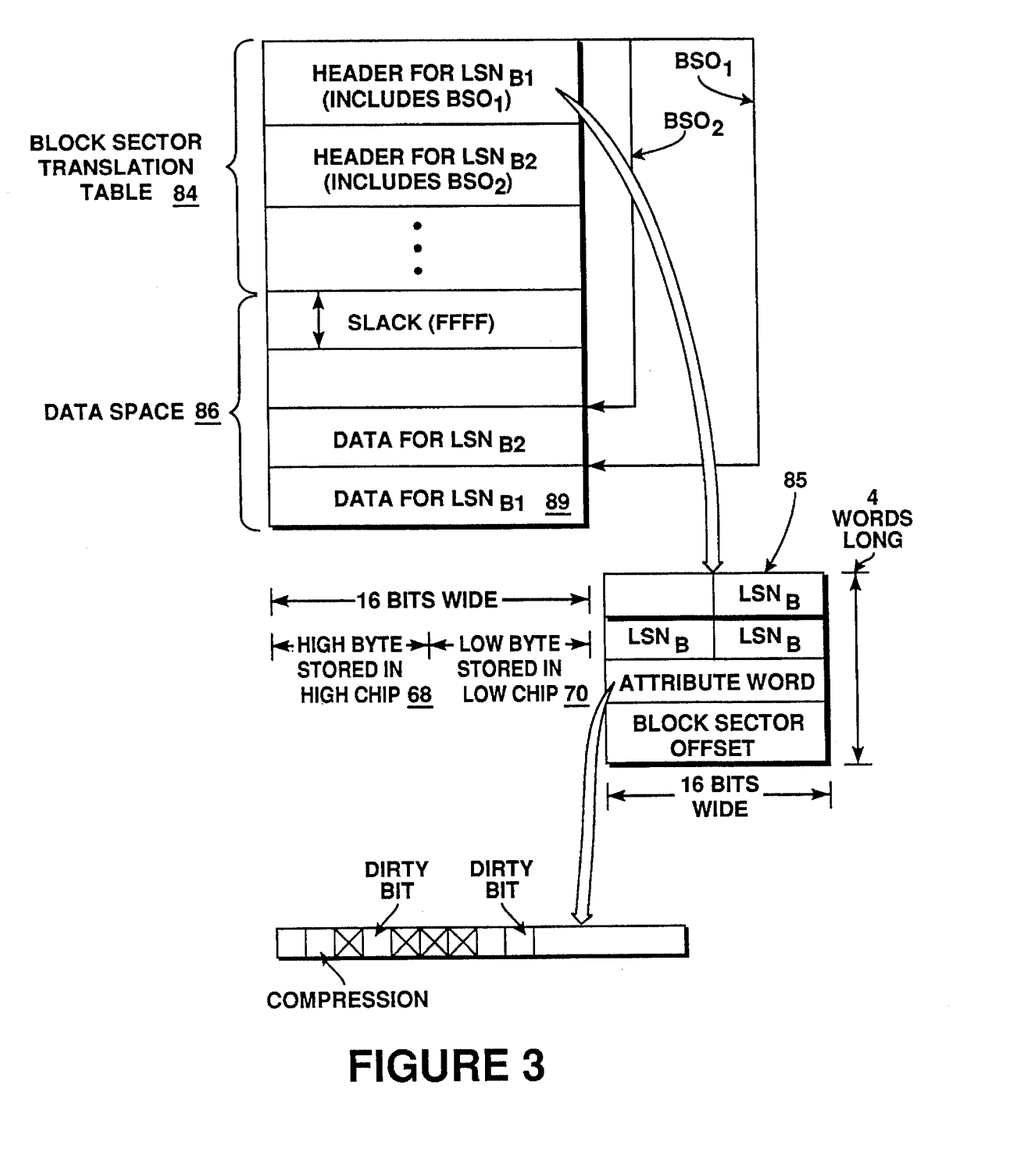
FIG. 3 is a block diagram of a block file structure.

FIG. 3 illustrates block 80 and the file structure used by it and all other blocks. Block 80 is represented as a single word wide structure but is actually stored in two FLASH chips. The high byte of each word is stored in high chip 68 and the low byte of each word is stored in low chip 70.

The data structure of block 80 includes block sector translation table 84 and data space 86. Block sector translation table 84 stores headers. A header is a block of information about one logical sector number and its associated data. As used herein a logical sector number (LSN) refers to a sector number stored within a BSTT. A sector number is a sector identifier received from host CPU 52, which host CPU 52 believes corresponds to a fixed physical location. However, as a result of the write policy used by solid state disk 60, an LSN does not correspond to a fixed physical location. Also as a result of the write policy used, several headers and LSNs may correspond to a single sector number.

Header 85 includes an attribute word that contains a great deal of information about the sector data associated with the header. One bit indicates whether or not the sector data has been compressed. The attribute word includes two dirty bits for reliability. The sector data associated with the header is considered valid if both dirty bits are set and dirty if either dirty bit is reset. The last piece of information stored in header 85 is a block sector offset (BSO). The BSO is an offset from the top of the block to the start of FLASH memory space associated with the header.

Block sector translation table 84 grows down toward data space 86. The first header BSTT 84 is written at the top of block 80. The header for each succeeding sector written into block 80 is stored below the previous header. In contrast to BSTT 84, data space 86 grows upward. The first sector of data written into block 80 is written into the bottom of data space 86. The next sector of data written into data space 86 is written immediately above the previous sector.

II. The Solid State Controller

A. Solid State Controller Hardware

Referring once again to FIG. 2, reading, writing, and clean-up of FLASH array 62 is controlled by solid state disk controller 64. Microprocessor 92 manages these tasks using sector header translation table (SHTT) 94, window ASIC 96, sector buffer 98 and a number of services, including that embodying the present invention, which are stored in FLASH memory 95.

Sector header translation table 94 translates the sector numbers received from host CPU 52 into pointers for the associated sector of data. In one embodiment, sixteen bits are stored for each entry in SHTT 94. Four of the bits indicate the chip pair in which the sector data being sought is stored. Another four bits indicate the particular block in which the sector is stored. The remaining 8 bits represent an offset from the top of the block to, or near, the desired header.

The application specific integrated circuit, window ASIC 96, serves as a window to the outside world for microprocessor 92 as well as a window into the FLASH array 62. Via window ASIC 96, microprocessor 92 receives commands from host CPU 52 to read from and write to FLASH array 62.

Data to and from host CPU 52 flows through window ASIC 96 to sector buffer 98. Sector buffer 98 allows data transfers to host CPU 52 to occur more rapidly than possible otherwise. Window ASIC 96 includes a sector counter 97. Sector counter 97 keeps track of the number of sectors of data stored in sector buffer 98. During execution of read command, the count is incremented each time microprocessor 92 writes a sector into sector buffer 98. Host CPU 52 is able to read a sector, or sectors, of data whenever the count of sector counter 97 indicates that sector buffer 98 stores at least one sector of data. The count of sector counter 97 is decremented whenever host CPU 52 reads a sector of data from sector buffer 98.

B. Overview of Solid State Controller Services

The heart of solid state disk controller 64 is the set of services stored within FLASH memory 95. These services control the reading, writing, and cleaning-up of FLASH array 62 and help create the illusion that host CPU 52 is dealing with an industry-standard hard magnetic disk drive.

Figure 4:
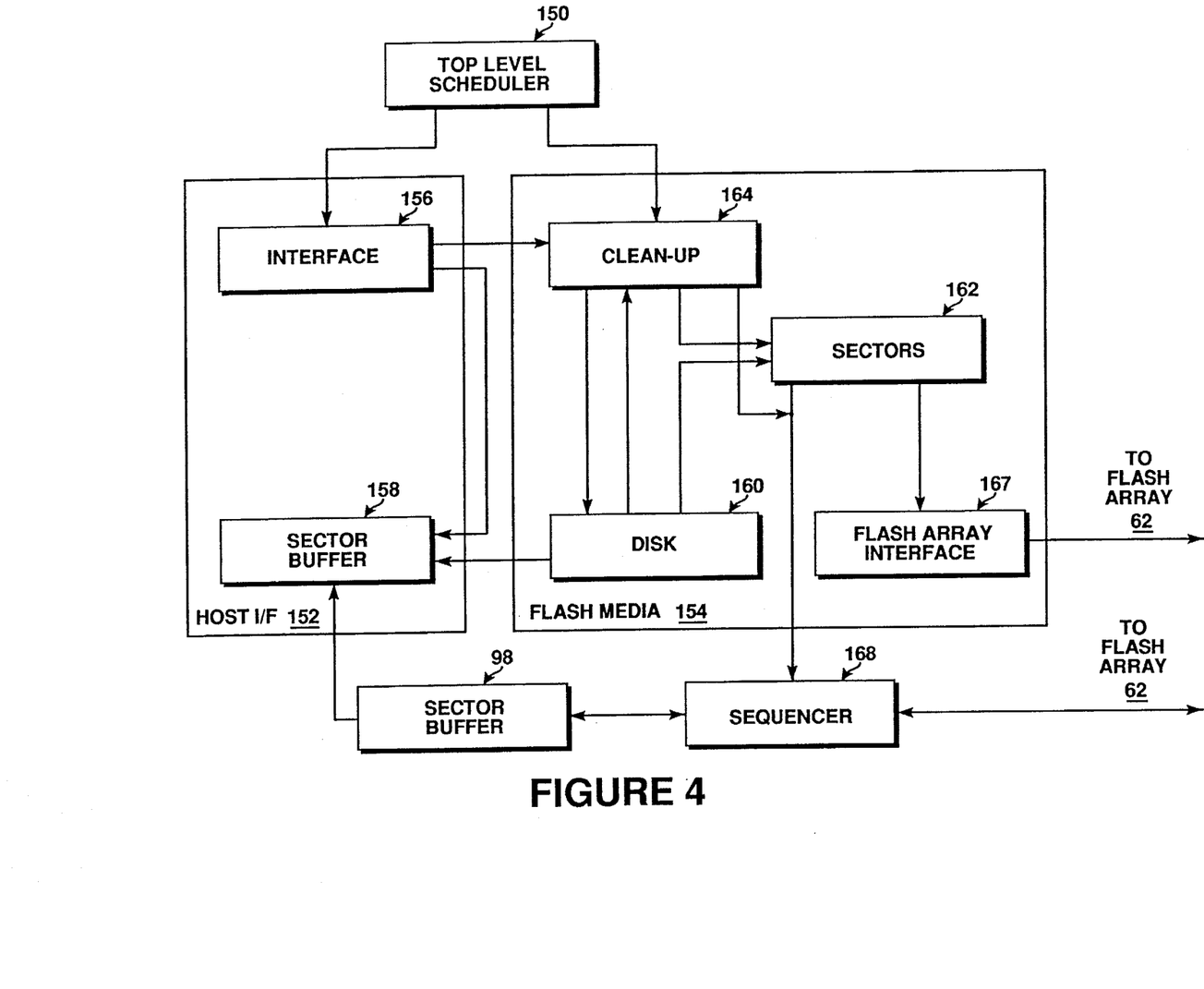
FIG. 4 is an object diagram of the services of the solid state disk controller.

The object diagram of FIG. 4 illustrates the general organization and interrelationship of services used by solid state controller 64. The services of solid state disk controller 64 are organized into three classes: top level scheduler 150, host interface 152, and FLASH media 154. Top level scheduler 150 handles the allocation of CPU 92 processing time between the other two classes 152 and 154. Host interface 152 interprets industry standard disk drive commands from CPU 52 and translates them into commands that FLASH media 154 can act upon. FLASH media 154 interfaces directly with FLASH array 62, responding to read and write requests from host interface 152. FLASH media 154 also manages the cleaning-up of FLASH array 62.

The scheduling of host interface 152 and FLASH media 154 is a relatively simple task. Power-up of solid state disk 60 fires top level scheduler 150, which initializes the solid state disk 60 and then calls host interface 152. This allocates to CPU 52 all the resources of solid state disk 60. When host interface 152 returns control to top level scheduler 150, clean-up object 164 is called. If a clean-up is on-going, then a slice of CPU 92 execution time, 500 μseconds in one embodiment, is allocated for clean-up. When clean-up object 164 returns control to top level scheduler 150, host interface 152 is called again. Top level scheduler 150 repeats the process again and again for as long as solid state disk 60 is powered up.

Host interface 152 includes two classes of services, interface 156 and sector buffer 158. Interface 156 emulates an AT-IDE hard disk interface. Interface 156 handles ATA command interrupts and translates ATA commands into commands comprehensible by FLASH media 154. In alternate embodiments, host interface 156 may simulate a SCSI disk interface or other standard disk drive interface. Sector buffer 158 manages the usage of sector buffer 98.

FLASH media 154 includes four types of services: disk 160, sectors 162, clean-up 164, and FLASH array interface 167. Disk 160 services read and write requests from interface 156. Disk 160 also translates other commands from disk 160 and delegates them for execution to fellow services 162, 164, and 167. Sectors 162 is responsible for most tasks relating to sectors stored within FLASH array 62. Sectors 162 controls the reading of data from FLASH array 62 via FLASH array interface 167 and sequencer 168. FLASH array interface 167 handles the low level routines which directly control the reading and writing of FLASH array 62. Sequencer 168 handles the movement of data from FLASH array 62 to sector buffer 98.

Clean-up object 164 cleans-up FLASH array 62 by managing the conversion of invalid user data into free memory. Clean-up 164 also implements the service of the present method for executing clean-up states during read command execution.

C. Reading Sectors from FLASH Array 62

Reading a sector of data from FLASH array 62 in response to a command from host CPU 52 is a four step process. First, SHTT 94 is searched for a pointer to the header associated with the sector number. Second, the header is located and its attribute word is examined to see if the attached data is valid; i.e., not dirty. Third, if the sector data associated with header is valid, its location within the block is determined. Fourth and finally, the sector data is copied from FLASH array 62 and into sector buffer 98. Sector counter 97 is then incremented by one. Host CPU 52 can then read the sector of data out of sector buffer 98. Sector counter 97 is decremented by one after host CPU 52 reads the sector from sector buffer 98.

Host CPU 52 can also request to read multiple sectors of data stored within FLASH array 62 via a single read multiple command. Responding to a request from host CPU 52 to read multiple sectors of data is a multistep process for each sector of data, like that described above. Solid state controller 64 can copy sectors of data into sector buffer 98 much faster than host CPU 52 can read sectors from sector buffer 98.

The speed differential largely arises because there is no upper limit imposed on the speed at which the read sequencer of window ASIC 96 may transfer sectors of data from FLASH array 62 to sector buffer 98 while there is an upper limit imposed on the speed at which sectors of data may be transferred from sector buffer 98 to host CPU 52 via SSD bus 53. SSD bus 53 preferably complies with an industry standard for disk drives, such as the AT-Attachment Standard, which controls and limits the data transfer rate of SSD bus 53. The speed difference also arises, in part, because of the large size of sector buffer 98, which is capable of holding tens of sectors of data in one embodiment.

D. Executing Clean-up States While Executing Read Commands

The speed differential between the transfer of sectors into and out of sector buffer 98 presents an opportunity to clean-up FLASH memory array 62 while host CPU 52 is reading from sector buffer 98 by enabling the clean-up state machine. The clean-up state machine is a finite state machine, each state of which takes approximately 500 μseconds of execution time. The brevity of clean-up states allows solid state disk controller 64 to execute a number of clean-up states while responding to a read command from host CPU 52.

Figure 5:
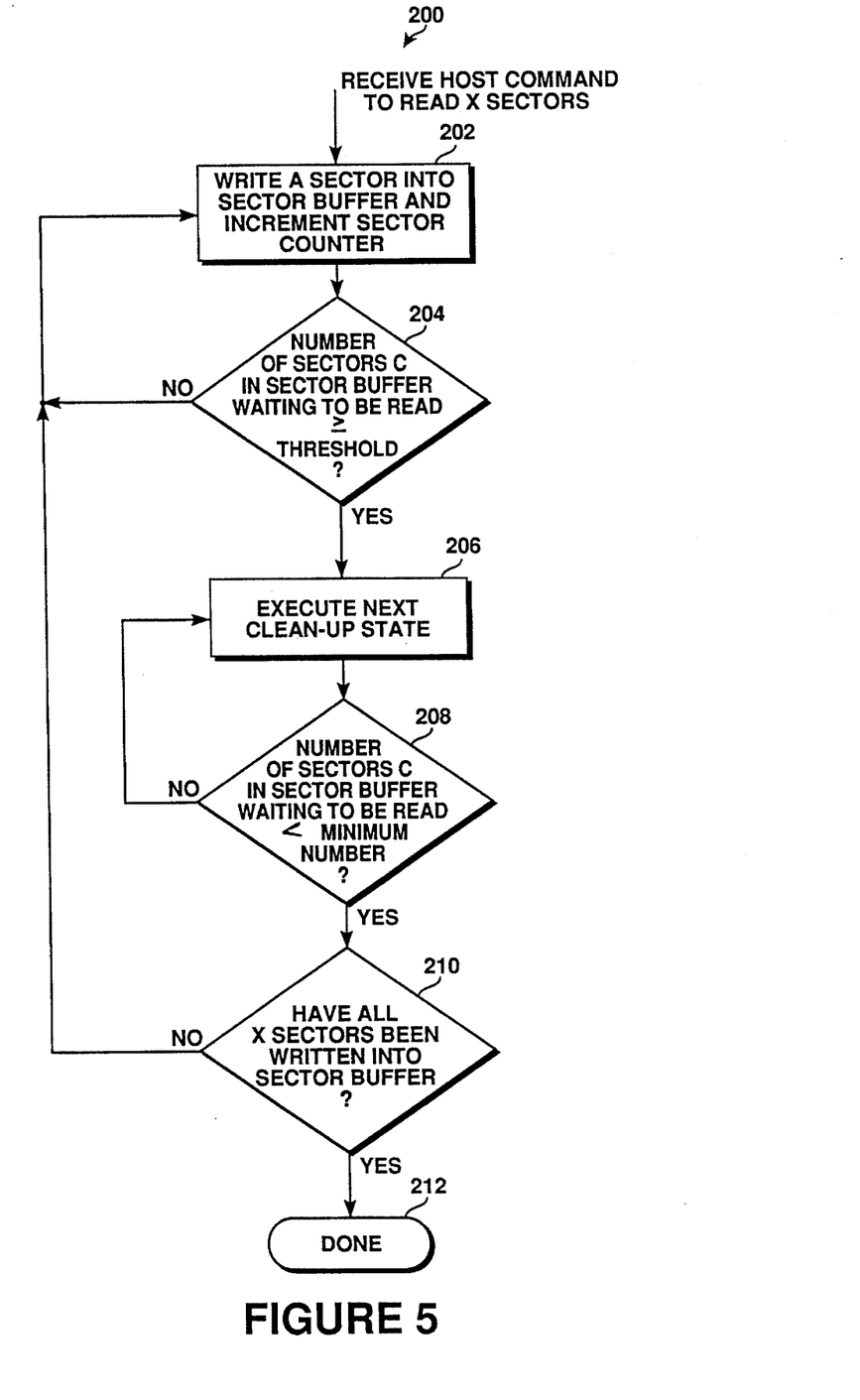
FIG. 5 is a flow diagram of a method for executing clean-up states during execution of a read command.

FIG. 5 illustrates in flow diagram form service 200 implemented by interface 156 to execute clean-up states while responding to a command from host CPU 52 to read multiple sectors of data. Microprocessor 92 branches to step 202 upon receipt of a command from host CPU 52 to read multiple sectors of data. In FIG. 5, "X" designates the number of sectors associated with the read command. During step 202 microprocessor 92 copies a sector of data from flash memory array 62 into sector buffer 98. After incrementing sector counter 97, microprocessor 92 advances to step 204.

Microprocessor 92 decides during step 204 whether it has a sufficient speed advantage over host CPU 52 to permit execution of a clean-up state. Microprocessor 92 makes this determination by comparing the count, C, of sector counter 97 to a threshold. The threshold represents a minimum number of sectors that are available to be read by host CPU 52 prior to beginning execution of a clean-up state. The threshold number is chosen so that execution of host CPU 52 does not have to wait for a sector of data to be written into sector buffer 98 before reading another sector of data. A minimum value of the threshold is 2 sectors. The threshold may be set higher; however, the threshold should not be set so high that clean-up states are never executed while host CPU 52 is reading sector buffer 98. If the count, C, of sector counter 97 is less than the threshold, microprocessor 92 does not have the desired time margin. Consequently, microprocessor 92 returns to state 202. On the other hand, if the count of sector counter 97 is greater than or equal to the threshold, microprocessor 92 advances to step 206 from step 204.

During step 206, microprocessor 92 executes one of the states of the clean-up state machine. The state executed will depend upon the state pointed to by a next state pointer, which effectively "chains" together the states of the clean-up state machine. Execution of any clean-up state requires approximately 500 μseconds, or less, of execution time from microprocessor 92, which is less time than required by host CPU 52 to read a number of sectors of data, N, from sector buffer 98. Stated mathematically:

N* SSD bus sector transfer rate>500 μseconds. After executing a state, or states, of the clean-up state machine, microprocessor 92 advances to step 208.

Microprocessor 92 next determines whether the number of yet to be read sectors, C, within sector buffer 98 exceeds a minimum number. The minimum number of sectors is chosen so that host CPU 52 does not have to wait for a sector data to be written into sector buffer 98 before reading another sector of data. In one embodiment, the minimum number of sectors is set equal to one. This provides microprocessor 92 sufficient time to write at least one sector into sector buffer 98 while a sector of data is being read from sector buffer 98 by host CPU 52. If the number of yet to be read sectors, C, exceeds the minimum, then microprocessor 92 branches back to step 206 to execute another clean-up state.

Eventually, the number of yet to read sectors, C, within sector buffer 98 will be equal to the minimum number of sectors. In that situation, microprocessor 92 responds by branching to step 210 from step 208. During step 210 microprocessor 92 determines whether any additional sectors of data must be written into sector buffer 98 to comply with read command from host CPU 52. Microprocessor 92 can make this determination using a second counter, which can be either incremented or decremented each time microprocessor 92 writes a sector into sector buffer 98, depending upon the second counter's initial value. If compliance with the read command from host CPU 52 requires writing any additional sectors into sector buffer 98, then microprocessor 92 returns to step 202 to write another sector. On the other hand, eventually microprocessor 92 will have copied all requested sectors of data into sector buffer 98. When that occurs, microprocessor 92 responds by branching to step 212, returning control to top level scheduler 150.

E. The Clean-Up State Machine

The clean-up state machine ("CSM") performs three major task to convert invalid user data into free memory. First, a block is selected as the focus of clean-up. Second, on a valid sector-by-valid sector basis, user data is relocated from the focus block into destination blocks. Relocation of user data is itself a multistep process, requiring allocation of memory, and copying of the sectors of user data into the destination blocks. Third, after all valid user data has been copied out of it, the focus block is erased, converting sectors of invalid user data into free memory.

Figure 6:
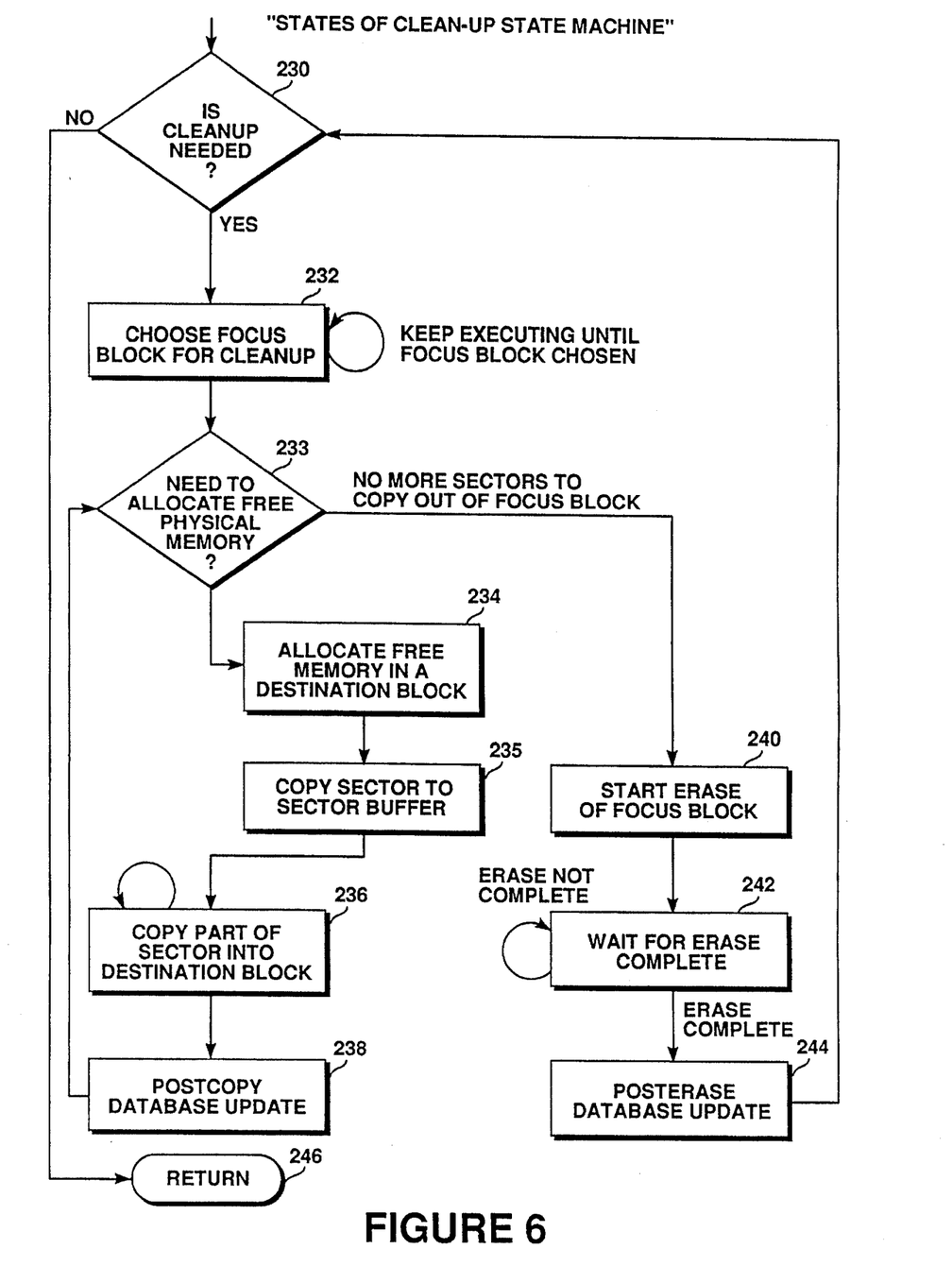
FIG. 6 is a flow diagram of the states of a clean-up state machine.

FIG. 6 gives an overview of clean-up by illustrating each state of a clean-up state machine. Each bubble in FIG. 6 represents one state, or service, of the clean-up state machine. The arrows between states represent the next state pointed to by the next state pointer at the end of a state. Each state appropriately modifies the next state pointer.

Clean-up begins in state 230 by evaluating whether clean-up is necessary. If clean-up is not necessary microprocessor 92 branches down to state 246. This returns control of microprocessor 92 to top level scheduler 150. On the other hand, if clean-up is deemed necessary, microprocessor 92 is pointed to state 232 by the next state pointer.

Clean-up begins in earnest in state 232 by selecting a focus block to clean-up. The goal in choosing a focus block is to select the block that it is most cost effective to clean. Cost effective clean-up involves striking a balance between keeping FLASH array 62 so clean that power consumption is excessive and keeping FLASH array 62 so dirty that foreground clean-up frequently occurs. The next state pointer then points microprocessor 92 to state 233.

Prior to cleaning up the dirty sectors within the focus block, valid sectors of user data must be safely relocated. This task requires branching through states 233, 234, 235, 236, and 238 repeatedly until each and every sector of user data within the focus block has been safely copied into new locations in other blocks. Relocation of user data begins in state 234 by locating a new physical location for one sector of valid user data. The block selected as the new location is referred to as a destination block. According to this terminology, clean-up has one focus block but may have many destination blocks. Microprocessor 92 is then pointed to state 235 by the next state pointer.

During state 235, a sector of valid user data is copied from the focus block into sector buffer 98.

During state 236 microprocessor 92 copies part of a valid sector from sector buffer 98 into the current destination block. Only a part of the valid sector is copied at one time given write speeds and the desire to keep clean-up from impacting response to read and write commands from CPU 52. Thus, microprocessor 92 may pass though state 236 several times before a valid sector is completely copied into destination block. Once the valid sector has been completely copied into the destination block, the next state pointer directs microprocessor 92 to state 238.

During state 238 microprocessor 92 updates sector header translation table 94 so that it points to the new location of the sector just copied from the focus block. Microprocessor 92 then returns to state 233.

Upon reentry to state 233, microprocessor 92 determines whether every valid sector within the focus block has been relocated. If not, another valid sector will be selected for relocation, and microprocessor 92 will branch through states 234, 235, 236, 238 and 233 until every valid sector within the focus block has been relocated. When that occurs, the next state pointer directs microprocessor 92 to state 240.

Microprocessor 92 begins erasure of the focus block in state 240. Microprocessor 92 initiates erasure by giving an erase command to the chip pair and indicating the block to be erased within the chip pair. This done, microprocessor 92 proceeds to state 242 to wait for the completion of erasure. The CSM remains in state 242 until the chip pair including the focus block indicates completion of erasure.

The focus block erased, microprocessor 92 updates and copies block attribute data back into the focus block. This done microprocessor 92 is redirected to state 230 by the CSM next state pointer.

Upon reentry to state 230, microprocessor 92 examines the block counter to determine if another focus block should be selected. If so, microprocessor 92 will branch through states 232, 234, 236, 238, 240, 242, and 244 as described. Otherwise microprocessor 92 branches to step 246, clean-up complete.

Thus, a method has been described for executing states of a clean-up state machine to convert invalid user data within a memory array into free while a host read command is being executed without any impact on the perceived performance of the solid state disk including the memory array.

In the foregoing specification, the invention has been described with reference to specific exemplary embodiments thereof. It will, however, be departing from the broader spirit and scope of the invention as set forth in the appended claims. The specification and drawings are, accordingly, to be regarded in an illustrative rather than a restrictive sense.

What is claimed is:

1. A solid state memory disk comprising:

a) a flash memory array storing valid sectors of data, free memory, and invalid sectors of data;

b) a buffer for storing sectors of data;

c) a counter having a count, the count being incremented when a sector of data is written into the buffer and the count being decremented when a sector of data is read from the buffer; and d) a memory array controller for controlling the reading and clean-up of the flash memory array, the memory array controller performing clean-up of the flash memory array while executing a command from the host to read a first number of sectors of data, the memory array controller including:

1) a clean-up state machine for converting invalid sectors of data into free memory, the clean-up state machine including a multiplicity of states, each state of the clean-up state machine modifying a next state pointer so that the next state pointer points to a next state to be executed; and 2) a read controller for executing the read command, the read controller writing the first number of sectors of data into the sector buffer and enabling execution of the next state of the clean-up state machine while the host is reading a sector of data from the buffer.

2. A computer system including:

a) a central processing unit generating a command to read a first number of sectors of data; and b) a solid state memory disk responsive to the command to read the first number of sectors of data, the solid state memory disk including:

1) a flash memory array storing valid sectors of data, free memory and invalid sectors of data;

2) a buffer for storing sectors of data, the buffer being coupled to the central processing unit;

3) a counter having a count, the count being incremented when a sector of data is written into the buffer and the count being decremented when a sector of data is read from the buffer; and 4) a memory array controller for controlling the reading, and clean-up of the flash memory array, the memory array controller including:

A) a clean-up state machine for converting invalid sectors of data into free memory, the clean-up state machine including a multiplicity of states, each state modifying a next state pointer so that the next state pointer points to a next state to be executed; and B) a read controller for executing the read command, the read controller writing the first number of sectors of data into the sector buffer and enabling execution of the next state of the clean-up state machine while the central processing unit is reading a sector of data from the sector buffer.

3. A method of performing a clean-up operation for a solid state disk, wherein the clean-up operation comprises a plurality of states, comprising the steps of:

a) receiving a read command from a host processor, the read command requesting a first number of sectors of data from the solid state disk wherein the solid state disk comprises nonvolatile semiconductor memory;

b) writing a second number of sectors of data from the nonvolatile semiconductor memory to a sector buffer; and c) executing at least one state of the plurality of states of the clean-up operation while the host processor is reading the sector buffer.

4. The method of claim 3 wherein the nonvolatile semiconductor memory includes FLASH memory.

5. The method of claim 3 wherein the clean-up operation comprises the steps:

a) determining a focus block to clean-up, wherein the focus block includes a valid sector of data and an invalid sector of data;

b) relocating the valid sector of data into at least one destination block; and c) erasing the focus block.

6. The method of claim 5 wherein step b) further comprises the steps of:

b1) allocating free memory in the destination block;

b2) copying the valid sector of data from the focus block to the sector buffer; and b3) copying at least a portion of the valid sector from the sector buffer to the destination block.

7. A method of performing a clean-up operation for a solid state disk, wherein the clean-up operation comprises a plurality of states, comprising the steps of:

a) receiving a read command from a host processor, the read command requesting a first number of sectors of data from the solid state disk, wherein the solid state disk comprises nonvolatile semiconductor memory;

b) writing a second number of sectors of data from the nonvolatile semiconductor memory to a sector buffer;

c) determining an available number of sectors of data within the sector buffer wherein the available number represents sectors available to be read by the host processor;

d) compare the available number to a threshold number; and e) executing at least one state of the plurality of states of the clean-up operation while the host processor is reading the sector buffer if the available number exceeds the threshold number.

8. The method of claim 7 wherein the nonvolatile semiconductor memory includes FLASH memory.

9. The method of claim 7 wherein the clean-up operation comprises the steps:

a) determining a focus block to clean-up, wherein the focus block includes a valid sector of data and an invalid sector of data;

b) relocating the valid sector of data into at least one destination block; and c) erasing the focus block.

10. The method of claim 9 wherein step b) further comprises the steps of:

b1) allocating free memory in the destination block;

b2) copying the valid sector of data from the focus block to the sector buffer; and b3) copying at least a portion of the valid sector from the sector buffer to the destination block.

11. A method of performing a clean-up operation for a solid state disk, wherein the clean-up operation comprises a plurality of states, comprising the steps of:

a) receiving a read command from a host processor, the read command requesting a first number of sectors of data from the solid state disk wherein the solid state disk comprises nonvolatile semiconductor memory;

b) writing a second number of sectors of data from the nonvolatile semiconductor memory to a sector buffer;

c) determining a number left representing the number of sectors yet to be read by the host processor from the sector buffer;

d) compare the number left to a minimum number; and e) executing at least one state of the plurality of states of the clean-up operation while the host processor is reading the sector buffer if the number left exceeds the minimum number.

12. The method of claim 11 wherein the nonvolatile semiconductor memory includes FLASH memory.

13. The method of claim 11 wherein the clean-up operation comprises the steps:

a) determining a focus block to clean-up, wherein the focus block includes a valid sector of data and an invalid sector of data;

b) relocating the valid sector of data into at least one destination block; and c) erasing the focus block.

14. The method of claim 13 wherein step b) further comprises the steps of:

b1) allocating free memory in the destination block;

b2) copying the valid sector of data from the focus block to the sector buffer; and b3) copying at least a portion of the valid sector from the sector buffer to the destination block.

15. A method of performing a clean-up operation for a solid state disk, wherein the clean-up operation comprises a plurality of states, comprising the steps of:

a) receiving a read command from a host processor, the read command requesting a requested number of sectors of data from the solid state disk, wherein the solid state disk comprises nonvolatile semiconductor memory;

b) write a sector of data from the nonvolatile semiconductor memory to a sector buffer;

c) increment a counter, wherein the counter is decremented in accordance with a number of sectors read by the host processor from the sector buffer;

d) returning to step b) if a value of the counter is less than a threshold number;

e) performing the following steps if the value of the counter is equal to or greater than the threshold number:

d1) executing at least one state of the plurality of states of the clean-up operation while the host processor is reading the sector buffer;

d2) comparing the value of the counter with a minimum number, d3) returning to step d1) if the value of the counter is greater than or equal to a minimum number; and d4) returning to step b) if the value of the counter is less than the minimum number and a number of sectors written into the sector buffer is less than the requested number.

16. The method of claim 15 wherein the nonvolatile semiconductor memory includes FLASH memory.

17. The method of claim 15 wherein the clean-up operation comprises the steps:

a) determining a focus block to clean-up, wherein the focus block includes a valid sector of data and an invalid sector of data;

b) relocating the valid sector of data into at least one destination block; and c) erasing the focus block.

18. The method of claim 17 wherein step b) further comprises the steps of:

b1) allocating free memory in the destination block;

b2) copying the valid sector of data from the focus block to the sector buffer; and b3) copying at least a portion of the valid sector from the sector buffer to the destination block.

* * * * *